(12) United States Patent
Harris et al.

(10) Patent No.: US 8,398,251 B2
(45) Date of Patent: Mar. 19, 2013

(54) METHOD AND APPARATUS FOR FABRICATING A PRECISION OPTICAL SURFACE

(75) Inventors: Geoffrey G. Harris, Midland (CA);
Daniel B. Mitchell, Port McNicoll (CA);
Douglas J. Brown, Midland (CA);
Alexandre D. Lifchits, Wyevale (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 555 days.

(21) Appl. No.: 12/612,437

(22) Filed: Nov. 4, 2009

(65) Prior Publication Data

US 2011/0102925 A1    May 5, 2011

(51) Int. Cl.
*G02B 5/08* (2006.01)
*G02B 5/26* (2006.01)

(52) U.S. Cl. .......................... 359/883; 359/884

(58) Field of Classification Search .................. None
See application file for complete search history.

(56) References Cited

U.S. PATENT DOCUMENTS

| 5,912,777 | A   | * | 6/1999 | Jaworske | 359/883 |
| 6,921,177 | B2  |   | 7/2005 | Schaefer |         |
| 7,344,263 | B2  | * | 3/2008 | Ishizuka | 359/883 |
| 2004/0165296 | A1 | * | 8/2004 | Schaefer | 359/883 |

* cited by examiner

*Primary Examiner* — Jade R Chwasz

(74) *Attorney, Agent, or Firm* — Lando & Anastasi, LLP

(57) ABSTRACT

A method involves forming a first surface on a substrate, applying to the first surface a layer of a material having a thickness less than approximately 10 microns, and precision polishing the layer of material to form a precision optical second surface on a side of the layer opposite from the substrate. A different aspect involves an apparatus that includes a substrate having a first surface, and a layer provided on the surface and having a thickness less than approximately 10 microns, the layer having on a side thereof opposite from the substrate a polished second surface with an RMS surface roughness less than approximately 10 Angstroms.

15 Claims, 5 Drawing Sheets

METHOD AND APPARATUS FOR FABRICATING A PRECISION OPTICAL SURFACE

FIELD OF THE INVENTION

This invention relates in general to optical surfaces and, more particularly, to fabrication of precision optical surfaces.

BACKGROUND

Optical parts are often fabricated by machining a substrate such as aluminum, including machining an optical surface on the substrate. These types of optical parts may, for example, be used as precision mirrors for long-range telescopes, multi-band imagers, military or commercial surveillance systems, targeting systems, laser designator systems, or other types of systems.

The performance and thus value of many optical systems is often limited in whole or in part by the accuracy and roughness of the optical surface on such an optical part. Existing techniques produce, at best, an optical surface with an RMS roughness of approximately 30 Angstroms. One effect of this degree of surface roughness is that, while existing systems may be used in the infrared (IR) range and, more recently, in the visible range, they are typically not suitable for use in the ultraviolet (UV) range. Also, some approaches require overcoat layers of significant thickness, but this can cause bi-material deformation in response to thermal changes. Accordingly, while existing techniques for fabricating optical surfaces have been generally adequate for their intended purposes, they have not been entirely satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
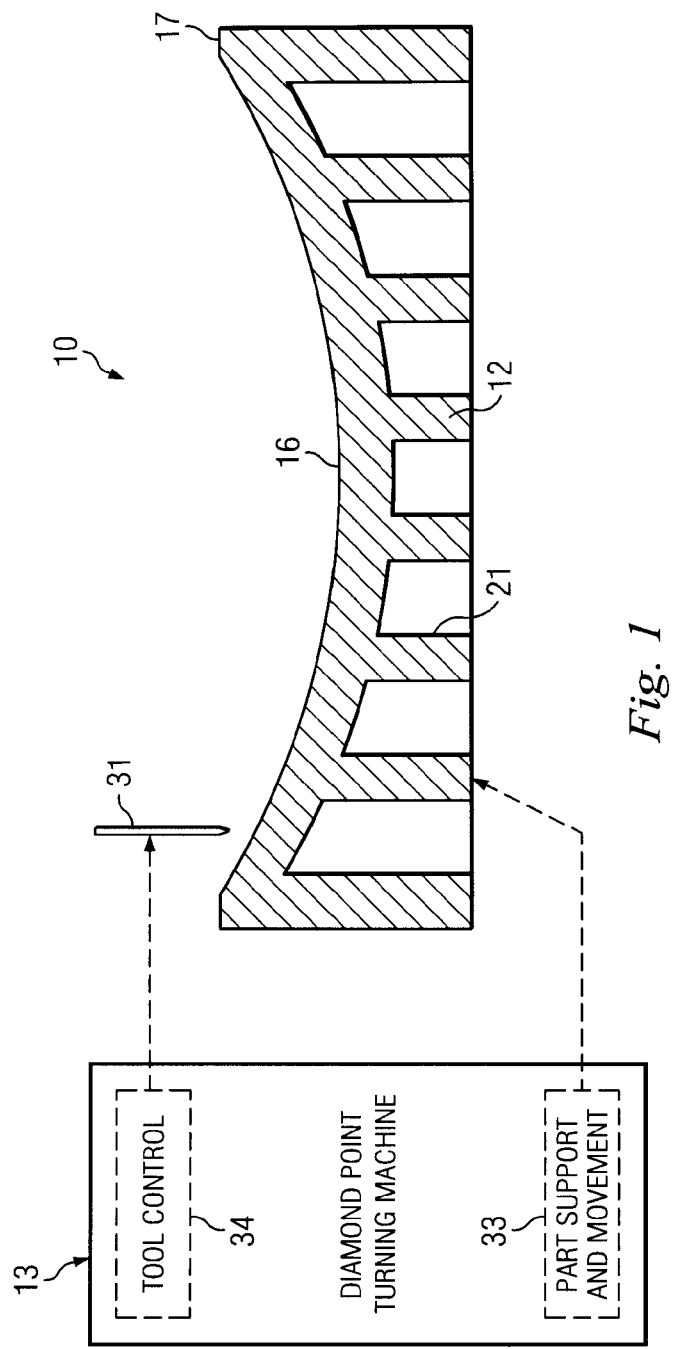
FIG. 1 is a diagrammatic view, partly in section, showing an apparatus that includes an optical substrate and a diamond point turning (DPT) machine.

FIG. 1 is a diagrammatic view, partly in section, of an apparatus 10 that includes an optical substrate 12 and a diamond point turning (DPT) machine 13. In the disclosed embodiment, the substrate is made from 6061 aircraft-grade aluminum, but it could alternatively be made from any other suitable material. In FIG. 1, the substrate 12 is depicted before any machining by the DPT machine 13. The substrate 12 as shown in FIG. 1 is obtained by taking a solid block of material, and pre-machining the block using known techniques to obtain the illustrated starting shape, which is approximately its final shape. This pre-machining includes formation of an optical surface 16 and an optional annular reference surface 17, where the surface 16 is approximately semi-spherical, and the reference surface 17 extends around the periphery of the surface 16. The optical surface 16 could alternatively have any other desired shape, and could for example be flat, or irregular.

The pre-machining also includes formation in a known manner of a number of recesses 21 in a side of the substrate 12 opposite from the surface 16. The creation of the recesses 21 is commonly referred to as "light-weighting". In order to avoid excessive stress within the substrate 12, formation of the light-weighting recesses 21 is carried out progressively, through a number of iterations. During each iteration, some material of the substrate 12 is removed, and then the substrate 12 is annealed. This ensures that the substrate 12 will be stable over time, and does not have residual stresses that might later cause deformation of the resulting optical part, notwithstanding variations in temperature or other environmental conditions. At the end of the pre-machining procedure, the substrate 12 should be very close to its final net shape, in order to minimize the processing required in later stages, enhance the performance of the final optical part, and reduce costs.

After pre-machining is completed, the substrate 12 is mounted in the DPT machine 13. The DPT machine 13 is itself a conventional device, and includes a DPT tool 31. The DPT machine 13 includes a part support and movement section 33 that supports the substrate 12, and also moves the substrate relative to the tool 31, for example by rotating the substrate about a not-illustrated axis. The DPT machine 13 also includes a tool control section 34 that effects movement of the DPT tool 31 in relation to the substrate 12. In particular, the tool control section 34 can selectively move the tool 31 in two or three orthogonal directions with respect to the substrate. The DPT machine 13 is used to carry out single-point diamond turning (SPDT) of the optical surface 16, and also any optional reference surface 17 that may be present. The SPDT machining operation will reduce the surface roughness of the surfaces 16 and 17, for example so that the root mean square (RMS) surface roughness is in the range of 60 to 100 Angstroms. The smaller the surface roughness, the better. Factors that contribute to the residual roughness include microscopic imperfections in the aluminum material, and "tearout" of aluminum material caused by the DPT tool 31. In the disclosed embodiment, state-of-the-art SPDT techniques known in industry are used with the goal of achieving an RMS surface roughness near the lower end of the 60 to 100 Angstrom range, in order to minimize the processing required in later stages, enhance the performance of the final optical part, and reduce costs.

Figure 2:
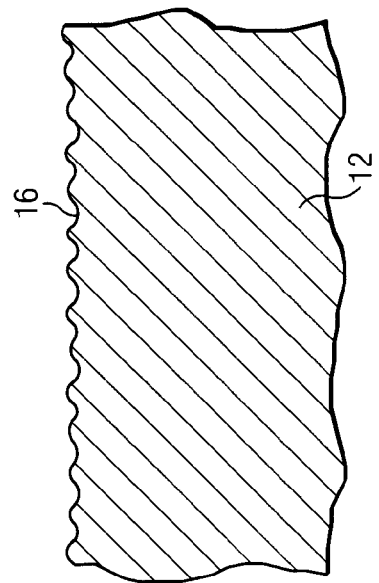
FIG. 2 is a diagrammatic fragmentary sectional side view showing in a greatly enlarged scale a very small portion of the substrate of FIG. 1 and an optical surface thereon, after completion of machining of the surface by the DPT machine of FIG. 1.

For clarity, the discussion that follows will typically refer only to the surface 16, but it should be understood that if the optional reference surface 17 is also present, then the surface 17 will be treated in the same manner as the surface 16. FIG. 2 is a diagrammatic fragmentary sectional side view of a very small portion of the substrate 12 of FIG. 1 with the surface 16 thereon, in a greatly enlarged scale and after completion of SPDT machining of the surface 16 by the DPT machine 13. The roughness of the surface 16 is visible in FIG. 2, and is within the above-mentioned range of 60 to 100 Angstroms RMS. Due to the degree of enlargement from FIG. 1 to FIG. 2, the curved surface 16 of FIG. 1 appears to be almost flat in FIG. 2.

After completion of the DPT machining, the surface 16 is cleaned in a known manner in preparation for electroless plating, using a series of cleaning chemicals such as bases and acids. The acids remove scaling, and other chemicals remove oils. Application of each pre-treatment chemical is followed by two to three water rinses, for example with de-ionized water, in order to remove any of the chemical that happens to be adhering to the surface 16.

Figure 3:
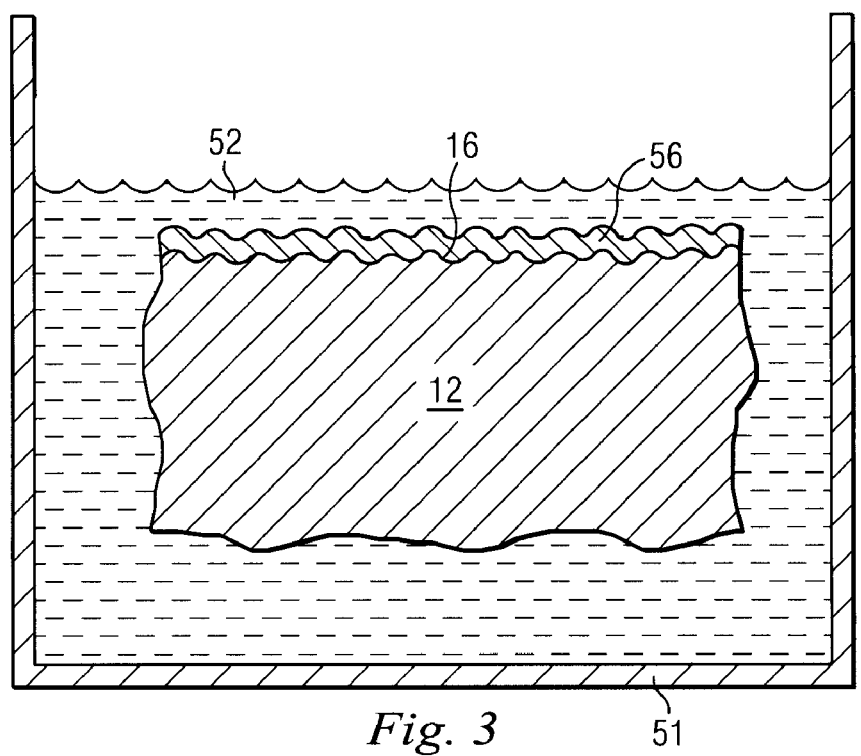
FIG. 3 is a diagrammatic fragmentary sectional side view showing the substrate after the optical surface has been DPT-machined and cleaned, and showing an electroless plating apparatus that includes a container with the substrate and an electroless plating solution therein.

FIG. 3 is a diagrammatic sectional and fragmentary side view showing an electroless plating apparatus that includes a container 51 having therein an electroless plating solution 52 and the DPT-machined substrate 12 of FIG. 2, after the above-described cleaning of the surface 16. The electroless plating solution 52 of FIG. 3 is known in the art, and carries out an auto-catalytic chemical process that deposits a layer 56 of nickel-phosphorus alloy on the DPT-machined surface 16 of the substrate 12. As is known in the art, this process relies on the presence of a reducing agent, for example hydrated sodium hypophosphite ($NaPO_2H_2.H_2O$). The reducing agent reacts with metal ions to deposit the nickel-phosphorus alloy. Unlike electroplating, it is not necessary to pass an electric current through the solution in order to form the layer 56. The plating process is carefully controlled in a known manner so as to ensure purity of the deposited alloy layer 56, and avoid the presence of gas bubbles trapped within the layer.

At the end of the electroless plating process, the alloy layer 56 will have a thickness in the range of approximately 1 to 10 microns, and more typically within a range of 2 to 3 microns, but the thickness could be larger or smaller. Due to the fact that the layer 56 is relatively thin, the outer surface of this layer tends to conform to the shape or roughness of the surface 16.

Figure 4:
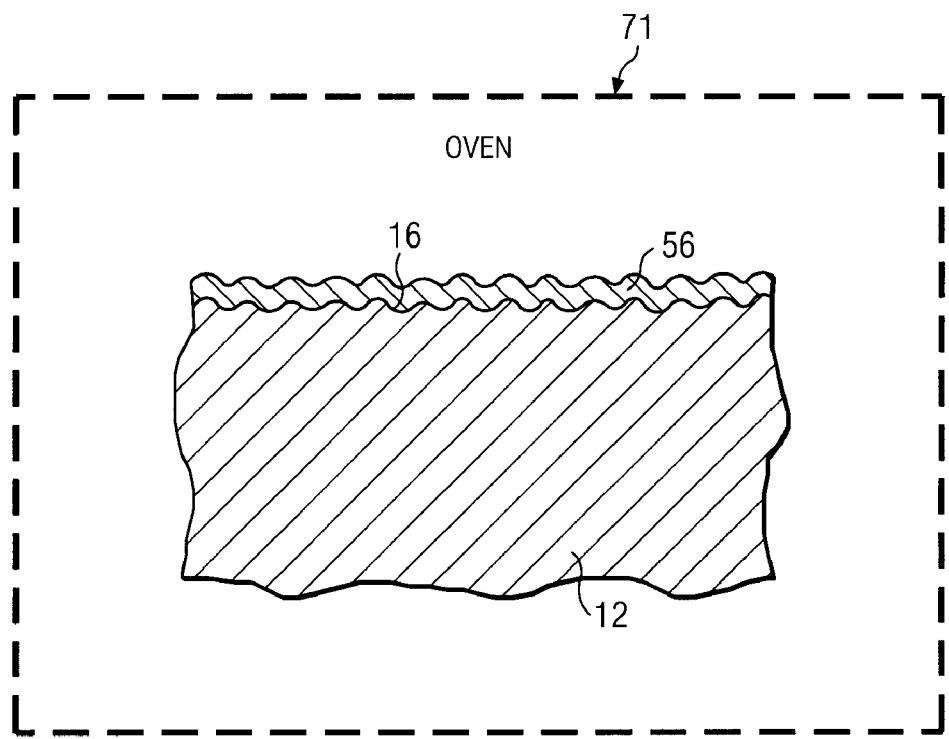
FIG. 4 is a diagrammatic fragmentary sectional side view showing the substrate after the electroless plating forms an alloy layer on the optical surface, and showing a conventional oven having the substrate therein.

The as-deposited electroless nickel-phosphorus layer 56 is typically too soft to facilitate good polishing. Therefore, according to the disclosed process, the layer 56 is annealed in order to harden it before subsequent polishing. In this regard, FIG. 4 is a diagrammatic sectional and fragmentary side view showing the plated substrate 12 within a conventional oven 71. In the disclosed embodiment, the temperature within the oven is progressively raised from ambient or room temperature to approximately 750° F. over a 45-minute time interval, and then is maintained at 750° F. for a time interval of about one hour. This hardens the alloy layer 56 on the substrate 12.

After the heat treatment, the plated substrate 12 is allowed to cool, and is removed from the oven 71. The alloy layer 56 is then subjected to precision polishing that removes much of the layer 56. This precision polishing involves an iterative process, where each iteration includes use of precision metrology followed by an advanced technique of precision polishing. At the start of this precision polishing, the surface 83 should have less than a few fringes of light error in form, or else the precision polishing may introduce higher spatial frequency form errors, while removing lower spatial frequency form errors typically present in the machined surface. The roughness of the surface 83 should be less than a maximum of about 0.1 microns, and typically about 0.006 to 0.01 microns (60 to 100 Angstroms), or else the surface may not become suitably smooth during the precision polishing process.

Figure 5:
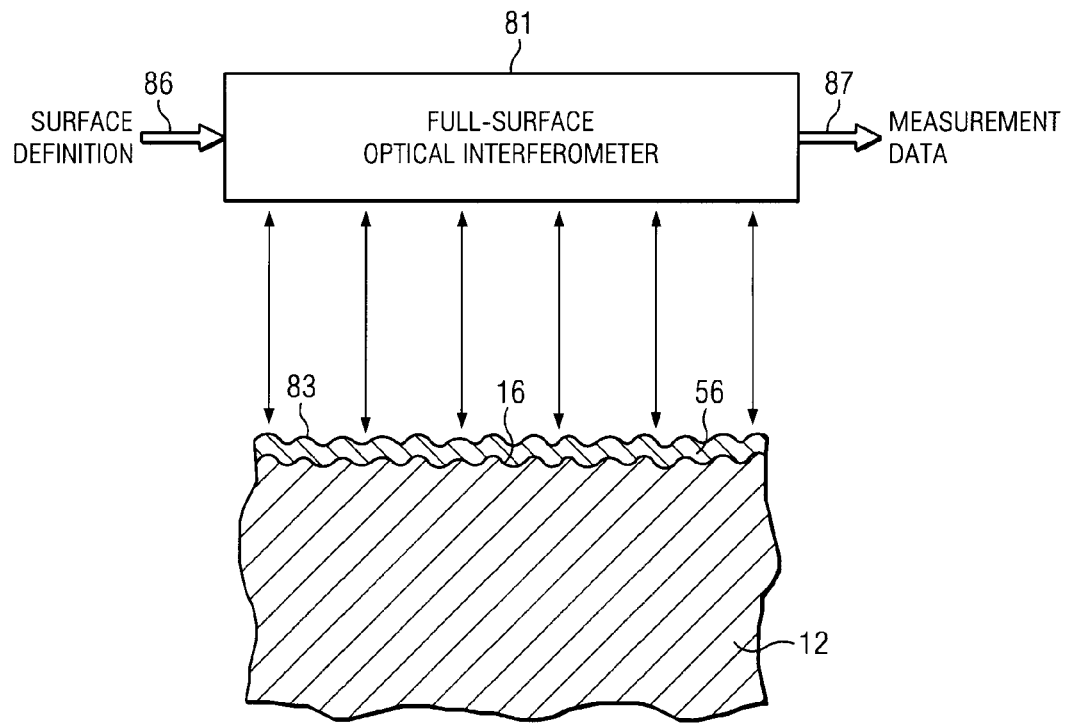
FIG. 5 is a diagrammatic view, partially fragmentary and in section, showing the plated substrate after heat treatment in the oven of FIG. 4, and showing a metrology apparatus that is a full-surface optical interferometer capable of very accurately measuring the outer surface of the alloy layer.

FIG. 5 is a diagrammatic view, partially fragmentary and in section, showing the plated substrate 12 and a metrology apparatus that, in the disclosed embodiment, is a full-surface optical interferometer 81 of a known type capable of very accurately measuring the outer surface 83 of the alloy layer 56. In the disclosed embodiment, the interferometer 81 is a model GPI XP/D available commercially from Zygo Corporation of Middlefield, Conn. Alternatively, however, it would be possible to utilize any other suitable metrology apparatus.

The interferometer 81 is supplied with a computer file containing a definition 86 of the ideal shape of the final optical surface desired on the alloy layer 56. The interferometer 81 measures the actual surface 83 on the alloy layer 56, compares it to the surface definition 86, and outputs a computer file containing measurement data 87 that indicates how the alloy layer 56 should be machined in order to bring the actual surface 83 into closer conformity with the ideal surface definition 86.

Figure 6:
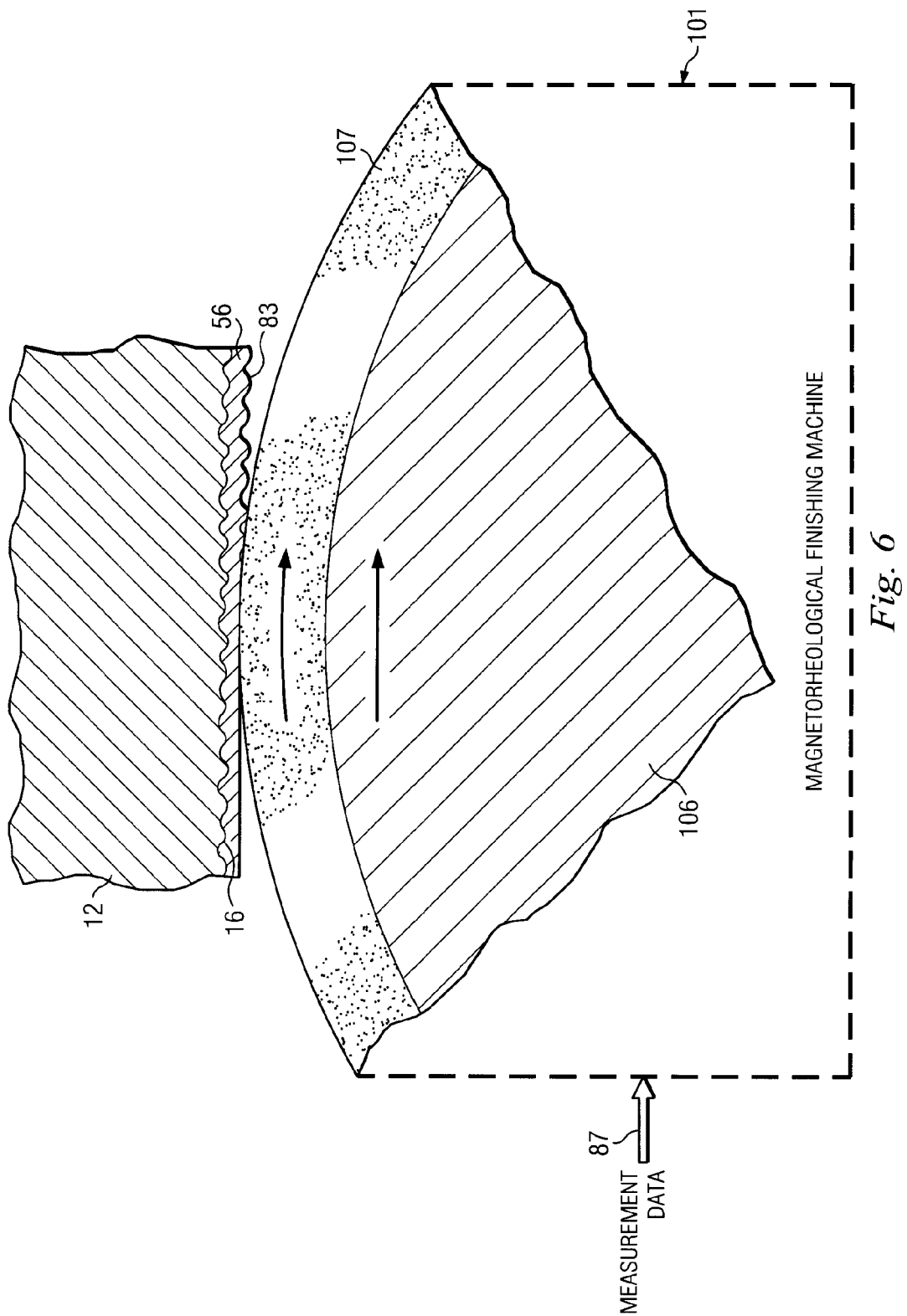
FIG. 6 is a diagrammatic view, partially fragmentary and in section, showing the plated substrate and showing a precision polishing apparatus that is a magnetorheological finishing (MRF) machine capable of very accurately polishing the surface of the alloy layer.

FIG. 6 is a diagrammatic view, partially fragmentary and in section, showing the plated substrate 12 and a precision polishing apparatus of a known type that is a magnetorheological finishing (MRF) machine 101. In the disclosed embodiment, the MRF machine 101 is a model Q22Y machine available commercially from QED Technologies of Rochester, N.Y. However, it would alternatively be possible to use any other suitable precision polishing machine. The machine 101 is known in the art and is therefore discussed here only briefly, and not in detail.

The machine 101 includes a rotating spherical wheel 106. A polishing slurry 107 is applied to the surface of the wheel 106, and is entrained and travels over the top of the wheel as the wheel rotates. The slurry 107 contains abrasive particles, for example a diamond powder. The machine 101 supports the plated substrate 12 in an inverted orientation just above the rotating wheel 106, and can move the substrate with two or three degrees of freedom relative to the wheel. This multi-axis control allows non-symmetrical (free-form) surface shapes to be accurately polished, in addition to spherical or other rotationally-symmetric forms. The moving slurry 107 engages and polishes the surface 83 on the alloy layer 56. The machine 101 receives the measurement data 87 from the interferometer 81 of FIG. 5, and moves the substrate 12 in relation to the rotating wheel 106, so as to accurately polish the surface 83 in a manner specified by the measurement data 87. More material will be removed in some regions than in other regions, based on the measurement data 87. As discussed above, the precision polishing process is an iterative process, where each iteration involves precision measurement using the interferometer 81 of FIG. 5, followed by advanced polishing using the MRF machine 101 of FIG. 6.

Figure 7:
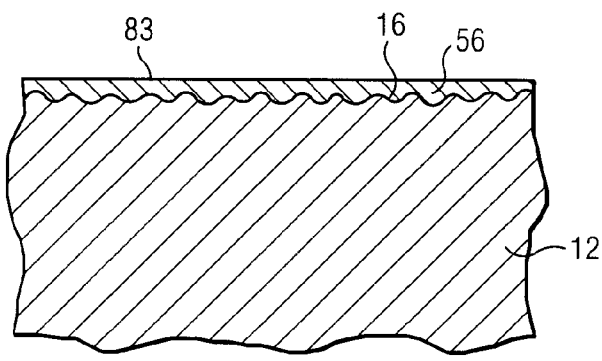
FIG. 7 is a diagrammatic fragmentary sectional side view showing the substrate after completion of precision polishing of the surface on the alloy layer using the metrology apparatus of FIG. 5 and the precision polishing apparatus of FIG. 6.

FIG. 7 is a diagrammatic fragmentary sectional side view showing the substrate 12 with the polished alloy layer 56 thereon, after completion of the precision polishing process. In particular, the surface 83 on the alloy layer 56 has been polished until it is very smooth, and conforms very closely to the ideal surface definition 86 (FIG. 5). In the disclosed embodiment, the polished alloy layer 56 will have a thickness less than approximately 10 microns, typically less than 5 microns, and more typically less than 1 micron. The polished surface 83 will have an RMS roughness less than approximately 60 Angstroms, typically less than 30 Angstroms, and more typically less than 10 Angstroms, (or even less if intended for use with ultraviolet radiation). Any error in shape (form error) will be a fraction of the 0.6 micron wavelength of the red light typically used for interferometric testing. This error is on the order of 1/10 of a wavelength, or in other words less than about 0.06 microns. Consequently, the surface 83 is sufficiently smooth that it can be accurately used not only for visible and infrared radiation, but also for shorter wavelengths such as ultraviolet radiation.

After the precision polishing, the alloy layer 56 is extremely thin, and is intrinsically interlocked into the surface roughness of the surface 16 on the aluminum substrate 12. This avoids the potential for a bi-material bending effect in response to temperature changes or other environmental variations.

Figure 8:
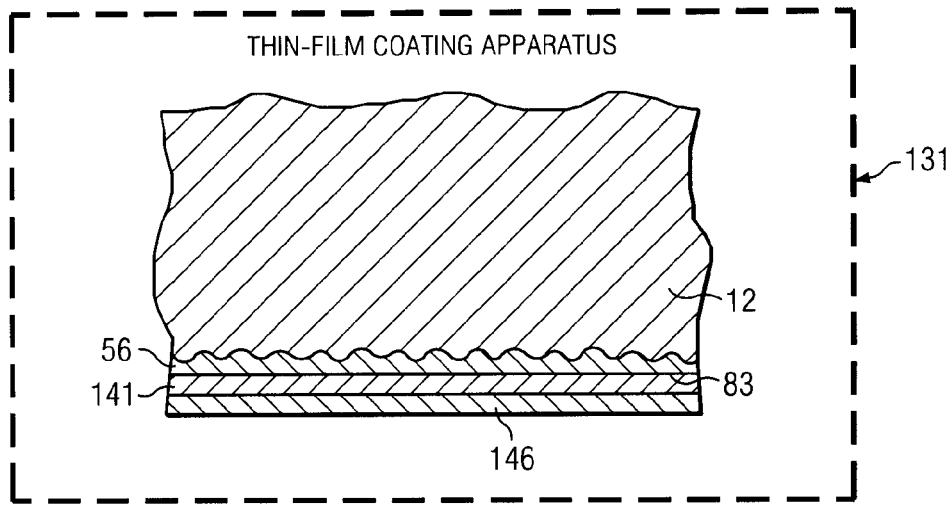
FIG. 8 is a diagrammatic view, partially fragmentary and in section, showing a thin-film coating apparatus having therein the substrate of FIG. 7 with two thin-film coatings on the polished surface.

FIG. 8 is a diagrammatic view, partially fragmentary and in section, showing the substrate 12 supported within a thin-film coating apparatus 131 of a known type. The coating apparatus 131 is used to first apply a thin-film reflective layer 141. The reflective layer 141 could optionally be a multi-layer coating but, for purposes of the present discussion, it is assumed that the reflective layer 141 involves only a single layer. In the disclosed embodiment, the reflective layer 141 is one of gold, aluminum or silver. Gold works well in the infrared range. Aluminum works well in the visible range (except it is slightly less reflective to wavelengths just below 1 micron). Silver has a flatter response than aluminum, but is not as reflective in the shorter visible wavelengths (such as blue light). Alternatively, however, and depending on the intended application, the reflective layer 141 could alternatively be made from any other suitable material.

If the reflective layer 141 is made from gold, it will have a thickness within a range of 70 to 200 nm, and more typically within a range of 80 to 100 nm. Alternatively, if the reflective layer 141 is made of silver, it will have a thickness within a range of 90 to 200 nm, and more typically within a range of 100 to 120 nm. As still another alternative, if the reflective layer 141 is made of aluminum, it will have a thickness within a range of 50 to 200 nm, and more typically within a range of 100 to 120 nm.

After application of the reflective coating 141, the thin-film coating apparatus 131 (or some other suitable coating apparatus) is used to form a thin-film protective layer 146 over the reflective layer 141. The protective layer 146 could optionally be a multi-layer coating but, for purposes of the present discussion, it is assumed that the protective layer 146 involves only a single layer. In the disclosed embodiment, the protective layer 146 is thin in comparison to the range of wavelengths at which it will be used. The protective layer 146 may, for example, be made of zinc sulfide or silicon dioxide, or any other suitable material. If the reflective layer 141 is made of gold, it may be advantageous to omit the protective layer 146, provided that the gold layer 141 can be suitably protected from the environment in which it will be used. The reflective layer 141 and the protective layer 146 (if present) provide desired spectral performance, mechanical performance, and/ or environmental durability performance.

The thickness of the protective layer 146 may be a function of the material from which it is made, and also a function of the range of wavelengths that it is to reflect. For example, if the protective layer 146 is made of zinc sulfide and is to reflect wavelengths in the visible range, it may have a thickness of approximately 100 nm. Alternatively, if the protective layer 146 is made of silicon dioxide and is to reflect wavelengths in the visible range, it may have a thickness of approximately 170 nm.

Figure 9:
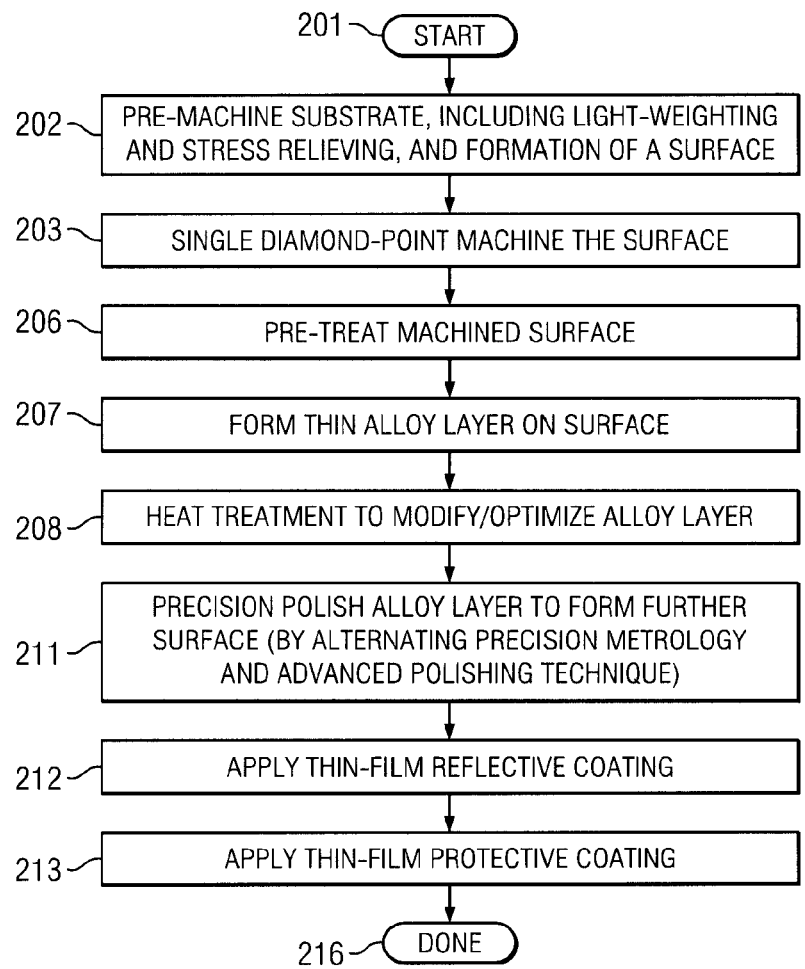
FIG. 9 is a flowchart summarizing the process depicted in FIGS. 1 to 8.

FIG. 9 is a flowchart summarizing the process discussed above in association with FIGS. 1 to 8. The process begins in block 201, and proceeds to block 202, where the substrate 12 is pre-machined to the pre-DPT shape shown in FIG. 1, including the iterative light-weighting and stress relief to form the cavities 21, and including the formation of the surfaces 16 and 17. Next, in block 203, the surfaces 16 and 17 are subjected to the SPDT machining operation using the DPT machine 13 of FIG. 1. Then, in block 206, the DPT-machined surfaces 16 and 17 are subjected to the pre-treatment that cleans them in preparation for electroless plating.

Next, in block 207, the thin nickel-phosphorus alloy layer 56 is formed on the surfaces 16 and 17 of the substrate using the electroless plating process depicted in FIG. 3. Then, this alloy layer is subjected to the heat treatment that hardens it, as shown in FIG. 4. Next, the alloy layer 56 is subjected to the precision polishing involving the iterative process that alternates precision metrology according to FIG. 5 with advanced polishing according to FIG. 6. Thereafter, in block 212, the thin-film reflective layer 141 is applied to the polished surface 83 using the coating apparatus 131 of FIG. 8. Then, in block 213, the thin-film protective coating 146 is optionally applied over the reflective coating 141 using the coating apparatus 131 of FIG. 8. The process then concludes at block 216.

Although a selected embodiment has been illustrated and described in detail, it should be understood that a variety of substitutions and alterations are possible without departing from the spirit and scope of the present invention, as defined by the claims that follow.

What is claimed is:

1. A method comprising:
    forming a first surface on a substrate;
    applying to said first surface a layer of a material having a thickness less than approximately 10 microns;
    after said applying, hardening said layer by progressively raising the temperature of said substrate and said layer from an ambient temperature to a selected temperature during a selected period of time, and thereafter maintaining said substrate and said layer at approximately said selected temperature for a selected interval of time; and
    after said hardening, precision polishing said layer of material to form a precision optical second surface on a side of said layer opposite from said substrate.

2. A method according to claim 1, including:
    carrying out said applying using a nickel phosphorus alloy as said material;
    selecting approximately 750° F. as said selected temperature;
    selecting approximately 45 minutes as said selected period of time; and
    selecting approximately 1 hour as said selected interval of time.

3. A method according to claim 1, including carrying out said applying using a nickel phosphorus alloy as said material.

4. A method according to claim 3, wherein said applying of said layer on said first surface is carried out using an electroless plating process.

5. A method according to claim 4, including cleaning said first surface after said forming and before said applying.

6. A method according to claim 1, wherein said forming of said first surface is carried out in a manner so that said surface has an RMS surface roughness less than approximately 100 Angstroms.

7. A method according to claim 6, wherein said forming of said first surface includes diamond point machining said first surface.

8. A method according to claim 1, wherein said precision polishing includes:
   precision measuring of said second surface; and
   thereafter precision finishing of said second surface.

9. A method according to claim 8, wherein said precision measuring includes carrying out full-surface optical interferometry.

10. A method according to claim 8, wherein said precision finishing includes carrying out magnetorheological finishing.

11. A method according to claim 1, including applying over said second surface after said precision polishing a layer of a reflective material.

12. A method according to claim 11, including selecting as said reflective material one of aluminum, silver and gold.

13. A method according to claim 11, including applying over said layer of reflective material a layer of a protective material.

14. A method according to claim 13, including selecting as said protective material one of zinc sulphide and silicon dioxide.

15. A method according to claim 1, wherein said applying is carried out in a manner so that said thickness of said layer of a material is less than approximately 5 microns.

* * * * *